3,838,087
RESIN MANUFACTURE
Dietrich Pirck, Reinbek, Gundolf Fuchs, Meilsen, and Gerhard Sachse, Hamburg, Germany, assignors to Deutsche Texaco Aktiengesellschaft, Hamburg, Germany
No Drawing. Filed July 14, 1972, Ser. No. 272,091
Claims priority, application Germany, July 26, 1971, P 21 37 239.4; Dec. 30, 1971, P 21 65 491.1
Int. Cl. C08f 41/12, 45/28
U.S. Cl. 260—33.6 UA                9 Claims

ABSTRACT OF THE DISCLOSURE

The present invention relates to a process for producing a lacquer resin component for baking varnishes wherein esterified-alkoxylated copolymers are produced in a sequential three stage process comprising copolymerizing vinyl aromatic hydrocarbon and maleic acid anhydride and sequentially half esterifying and alkoxylating the resultant copolymer. All three stages of the process are conducted in a continuous phase in the presence of a dispersing agent and a high boiling liquid hydrocarbon solvent medium, said hydrocarbon being preferably of a substantially non-aromatic nature, said dispersing agent being a copolymer of (1) esters formed from alpha, beta-unsaturated carboxylic acids and long chain aliphatic alcohols in the range of from $C_{10}$ to $C_{20}$ cadbons or mixtures thereof and (2) ethylenically unsaturated copolymerizable compounds.

BACKGROUND OF INVENTION

The present invention relates to a process for producing alkoxylated copolymers of vinyl aromatic hydrocarbon and maleic acid half esters by polymerizing said vinyl aromatic hydrocarbon with maleic acid anhydride and then sequentially partially (essentially half) esterifying and alkoxylating the resultant copolymer.

Processes for producing hydroxyl polymers by polymerizing alpha, beta-unsaturated monocarboxylic and dicarboxylic acids or esters thereof and vinyl compounds and subsequently alkoxylating these polymers are known. However, in none of the known processes does the copolymerization of maleic acid, its half ester or hydroxyl ester as the only carboxylic acid component, with vinyl compounds lead to non-gelated hydroxyl copolymers having sufficient degree of polymerization and a suitable colour.

There are three possibilities of varying the sequence of operations in the prior art processes:

(1) Sequence 1—Anhydride Copolymerization-Esterification-Alkoxylation
(2) Sequence 2—Half Esterification-Half-Ester Copolymerization-Alkoxylation
(3) Sequence 3—Half Esterification-Alkoxylation-Copolymerization.

However, the so produced resins are not utilizable or their production in the above manner is technically extremely difficult and therefore uneconomical.

The particular problems of the prior art processes are described as follows:

Sequence 1

The copolymerization of maleic acid anhydride and vinyl aromatics, especially styrene, is known as an example for a strictly alternating sequence of monomers in the copolymer. It is further known that the length of the molecular chains is materially influenced by the copolymerization temperature. For the production of the suitable lacquer resins, the k-value which is representative of the chain lengths of the polymer, may not exceed a certain level otherwise the final product, the lacquer resin solution, shows a too high viscosity at the required solid material concentration and also a quanitative esterification of the anhydride groups in the copolymer is no longer guaranteed. When aromatic solvents are used in the Sequence 1 method using the prior art techniques, the copolymerization may be conducted as a precipitation polymerization, at a temperature of about 125° C. and this temperature can be increased to 135° C. when adding saturated hydrocarbons and the precipitating copolymer particles do not stick together; however, at temperatures of about 150° C. which is the preferred temperature range for obtaining the optimum k-value copolymer, polymeric smears are produced which cannot be technically processed. In further explanation of the k-value, it is a measure of polymer chain lengths and is described in detail in the text of H. Fikentscher "Cellulose-chemie," 13, 58 (1932).

Sequence 2

In the Sequence 2 method using the prior art techniques, one did not find it difficult to produce maleic acid half-esters from maleic acid anhydride with alcohols, but the process must be operated under strictly controlled conditions in order to keep the residual maleic anhydride content low and prevent diester formation. However, even under carefully controlled polymerization conditions, the maleic acid half-esters show a tendency to undesirably disproportionate into maleic acid and maleic acid diester. Under the condition of the copolymerization reaction of maleic acid half-ester and styrene, maleic acid diesters are essentially unable to enter into the polymerization reaction. This inability not only results in a decrease of copolymer product yield, but the residual monomer content adversely affects the copolymer reaction during alkoxylation and is deleterious when the final product is employed as a lacquer resin or lacquer resin component.

Sequence 3

In the third process variation employed in the prior art, it is possible to manufacture beta-hydroxyalkyl-maleic half-esters by reacting maleic half-esters with 1,2-epoxides but besides that, high molecular products having a strong tendency towards resinification are formed. One of the undesirable side-reactions is the reaction of hydroxyl groups of either hydrolyzed epoxide or hydroxyl monomers with the double bond of maleic acid or its derivatives, respectively. It is to be noted that the reaction of a glycol with the double bond of maleic acid derivatives of various kinds is described in an essay, issued in "Farbe und Lacke" (Paint and Lacquer), Vol. 75, p. 523 (1969). Because of this hydrating etherification as an undesirable side-reaction, no more polymerizable low molecular compounds are formed. These compounds have a substantially higher molecular weight than the desired hydroxyl esters so that the latter can be separated by distillation. However, due to thermal stress, even employing careful distillation conditions, the above side-reaction is further intensified thus resulting in a considerable loss of desired product yield.

DETAILED DESCRIPTION OF THE INVENTION

Surprisingly, it was found the aforementioned difficulties can be overcome by a modification of aforedescribed Sequence 1 procedure by carrying out the copolymerization in the presence of a denfined dispersing agent. The presence of dispersing agent permits the copolymerization to operate at optimum temperatures of about 150° C.

and higher to obtain copolymer products having the desired $k$-value of between 16 and 22, preferably between 18 and 20, without unprocessable polymeric smears occurring. Another advantage of the contemplated modification of the Sequence 1 method, conducted in the presence of dispersant, is that the quality of the colour of the copolymer during the esterification stage remains essentially unaffected, this not being the case in the prior art non-dispersant method. Still another advantage is that such a fine dispersion of copolymer is obtained by using the contemplated dispersing agents of the present invention that surprisingly even when esterifying in excess alcohol in accordance with an embodiment of the invention employing high boiling alkyl aromatic hydrocarbon reaction medium as solvent, a soluble half-ester copolymer is obtained with no occurrence of a lump forming smear during the transition phase, the latter being technically unprocessable. It is to be noted that although it is possible to produce maleic acid anhydride-styrene copolymers in the first stage having the desired $k$-value of 20 and lower at temperatures as low as 135° C. using non-dispersant procedures by employing more polymerization initiator (e.g., benzoyl peroxide, azo-isobutyric acid nitrile, or the like), the polymeric products formed by non-dispersant techniques differ structurally in a substantial manner from those polymeric products produced in the presence of dispersing agents contemplated in the present invention even though the non-dispersed and dispersed polymer both are in the same $k$-value range. This difference is exemplified by the fact that the anhydride copolymers produced in the presence of the dispersing agent contemplated in the invention may be esterified without difficulty to the extent the anhydride groups are essentially extinguished whereas this apparently is not the case with products being produced in the absence of the defined dispersing agents. This fact is illustrated in subsequent Example 3 in that the gel formation during the alkoxylation (ethoxylation) phase recited therein is attributed to residual anhydride groups.

A further advantage of the process of the invention is that resin suspensions with solid contents of up to about 65 wt. percent can be produced and still be of a low viscosity, (e.g., 10 cp. at 25° C.) without lumping whereas without the contemplated dispersing agents the maximum solid contents which can be obtained without any lumping is about 50 wt. percent even at temperatures below 140° C.

In specific detail, the present invention relates to a three stage continuous phase process for producing a lacquer resin component employed in baking varnishes comprising as follows:

(a) First stage.—Copolymerizing a vinyl aromatic hydrocarbon of from 8 to 12 carbon atoms and maleic acid anhydride in the presence of a dispersing agent and a liquid hydrocarbon solvent medium having a boiling point between about 170 and 230° C. or an alkylaromatic solvent medium having a boiling range of from 150 to 180° C. at a temperature of between about 120 and 175° C. to form a first stage reaction mixture containing vinyl aromatic hydrocarbon-maleic acid anhydride copolymer where said copolymer has a $k$-value between 16 and 22, preferably between 18 and 20, said copolymerization being conducted utilizing a mole ratio of vinyl aromatic hydrocarbon to maleic acid anhydride of about 1:1, a dispersing agent content of between about 0.5 percent and 3.0 percent, preferably 1.0 percent, and a liquid hydrocarbon medium content of between about 60 and 35 wt. percent basis the first stage reaction mixture, said dispersing agent consisting of a copolymer of an ester of alpha, beta-unsaturated carboxylic acid and an alkanol of from 10 to 20 carbon atoms and ethylenically unsaturated, preferably vinyl aromatic, copolymerizable compounds. The first stage copolymerization is preferably conducted at temperatures ranging between about 120 and 175° C. It is to be noted that with the presence of a contemplated dispersing agent it is possible to copolymerize at temperatures ranging from about 140 to 175° C. which was technically not possible in the prior processes.

(b) Stage 2.—The reaction mixture from Stage 1 copolymerization is contacted with an esterifying agent selected from the group consisting of alkanol and alkoxyalkanol of from 3 to 12 carbon atoms at a temperature between about 140 and 180° C., preferably between about 150 and 175° C. utilizing a mole ratio of esterifying agent to initial maleic acid anhydride of about 1.1:1 to form a second stage reaction mixture wherein the copolymer of the first stage is partially esterified (half-esterification being the goal), the esterifying agent having preferably from 3 to 12 carbon atoms. In the esterification, standard esterification acid catalysts can be employed normally in amounts between about 0.1 and 1 wt. percent of the esterification reaction mixture. A preferred acid catalyst is phosphoric acid or acid esters thereof. By employing hydrocarbon solvents with only a minor content of aromatic compounds, the half-ester remains in solid form. It is to be noted when high boiling aromatic hydrocarbons are employed as the solvent medium, the resultant copolymer in the first stage is also formed as solid particles. However, in the second stage esterification in the presence of the dispersant the anhydride copolymer is continuously transformed into a genuine solution. This procedure is suitable for manufacturing solvent-based lacquers.

(c) Stage 3.—The partially esterified reaction mixture obtained from Stage 2 is contacted with an alkylene oxide of from 2 to 4 carbon atoms at a temperature between about 60 and 100° C. utilizing a mole ratio of alkylene oxide to initially employed maleic acid anhydride of between about 1:1 and 1:2 to form the alkoxylated copolymers of vinyl aromatic hydrocarbons and maleic acid anhydride half-esters. These copolymers may be recovered from the alkoxylation reaction mixture by standard means, preferably by removing the solid hydroxyl resin emerged from Stage 3 by filtration or by removing volatiles via distillation utilizing elevated temperature and/or reduced pressure. In case of employing said alkyl aromatic hydrocarbons in order to obtain solvent-based lacquers, no separation is needed. The resultant hydroxyl resins are valuable basic resins or components for high quality thermosetting resin coatings. Preferably, they are used in combination with melamine resins or blocked isocyanates, but it is also possible to use them as the sole substance with success. The hydroxyl resins obtained according to the invention may be hardened with unblocked isocyanates even at room temperature provided that the alcohols in the final reaction solution are exchanged with esters, ethers, etc.

In Stage 1 examples of vinyl aromatic hydrocarbon monomer reactants contemplated herein are the nuclear alkylated styrenes such as vinyl toluenes and vinyl xylenes of from 8 to 12 carbon atoms, preferably from 8 to 10 carbon atoms. Styrene is the most preferred monomer.

The dispersing agent introduced in the first Stage of the process is obtained either by copolymerizing esters of alpha, beta-unsaturated mono- or dicarboxylic acids and alkanols having from 10 to 20 carbon atoms, preferably from 12 to 18 carbon atoms, with ethylenically unsaturated copolymerizable compounds or by copolymerizing ethylenically unsaturated compounds with maleic acid anhydride in dispersion according to the first stage of the resin procedure but at a lower temperature of from about 90 to 120° C. and subsequent esterification with the aforementioned alkanol of from 10 to 20 carbon atoms, or mixtures thereof. Said dispersant copolymer has a $k$-value of between about 30 and 50. Examples of the alpha, beta-unsaturated monocarboxylic acid component are the acrylic and alkacrylic acids of from 3 to 4 carbon atoms. Specific examples are acrylic acid and methacrylic acid. Examples of the dicarboxylic acids are alpha, beta-alkenedioic acids of from 4 to 5 carbon atoms such as maleic acid and fumaric acid. Examples of the alcohols formulating the dispersant copolymer are decanol, dodecanol, octadecanol, eicosanol and mixtures of two or more members thereof. Examples of the ethylenically unsaturated copolymerizable compounds are the alkenes such as the alpha olefins having from 2 to 6 carbon atoms, e.g., propylene, 1-isobutylene and the aromatic vinyl compounds of from 8 to 12 carbon atoms such as styrene and its nuclear and/or side chained alkylated derivatives such as vinyl toluenes and vinyl styrenes. In the preparation of the copolymer dispersants the esterified unsaturated acid and ethylenically unsaturated compounds are copolymerized utilizing a mole ratio of between about 1:1 and 1:1.5. Further, when a dicarboxylic acid is employed to formulate the dispersant half-ester as well as partially diester containing derivatives are envisioned.

Examples of the liquid hydrocarbon solvent medium introduced in the first stage in which the starting components are soluble are aromatics such as methylethylbenzene, mesitylene, cumene, and pseudocumene and mixtures thereof. When employing the lower boiling aromatics as solvent media such as benzene, toluene, or xylene, superatmospheric pressure may be employed to maintain the solvent in the liquid state under reaction conditions. Examples of the more preferred solvent media are the essentially non-aromatic hydrocarbon media such as a kerosene cut boiling at a temperature of between 170 and 230° C. The essentially non-aromatic solvent media are preferred since they not only permit the copolymerization in Stage 1 in the completely dispersed state but also in the subsequent esterification and alkoxylation stages. A further advantage of employing a substantially aromatic-free hydrocarbon solvent medium is that the polymer particles formed in the Stage 2 esterification and Stage 3 alkoxylation are recovered as micro pearls and may be easily separated from the major portion of the liquid phase by means of filtration. Residues of the solvent medium may be separated from the final resin product in Stage 3 by standard techniques such as washing the resin with low boiling hydrocarbon, e.g., pentane to remove the residues of the high boiling solvent medium and removing residual low boiling hydrocarbons by distillation, and therefore, the thus purified lacquer resin component may be obtained as a solid resin without any extensive drying expenditure. Further examples of the essentially non-aromatic solvent media contemplated herein are the nonpolar fluids such as liquid n-paraffins and iso-paraffins as well as mixtures thereof and crude n-paraffins and isoparaffins having aromatic contents up to about 15 volume percent and olefin contents of up to about 2 volume percent. It is preferred to use the higher boiling hydrocarbon reaction media, especially the crude mixtures of said hydrocarbons, e.g., kerosene where the kerosene fraction has a boiling range of from 170 to 280° C., preferably from 170 to 230° C. and an aromatic content of up to about 15 volume percent and an olefinic content of about 2 volume percent. The aromatics and olefinic portions in the preferred kerosene solvent medium fraction have the same boiling range as the aliphatic hydrocarbon. The use of higher boiling hydrocarbons as solvent medium are preferred because it permits the three stages to be conducted under normal pressure at the employed reaction temperatures. However, superatmospheric pressures may be employed to maintain the solvent reaction medium in a liquefied state.

The present invention is illustrated by following Examples 4 to 9 but these examples are not to be construed as limitations thereof. Examples 1 to 3 represent the prior art and are submitted for comparison only.

EXAMPLE 1

An aromatic hydrocarbon solvent medium having a boiling range of from 150 to 170° C. and weighing 404 grams was heated to a temperature of 150° C. To said liquid medium are added at a rate of 2 moles per hour 98 grams of maleic acid anhydride and 104 grams of styrene representing a mole ratio of 1:1, in which 1 wt. percent of benzoyl peroxide polymerization catalyst based on the weight of maleic acid anhydride and styrene is dissolved. The exothermic heat of reaction was dissipated by vaporizing the high boiling aromatic solvent medium at the reaction mixture reflux temperature (150–170° C.). At the very beginning of the monomer addition to the solvent medium a precipitating polymer was formed as indicated by cloudiness of the reaction mixture. However, within 10 minutes after the initial monomer addition a glassy viscous polymer smear was formed that stuck to the walls of the reaction vessel and wound itself around the stirrer. The resultant reaction mixture cannot be economically processed on a commercial scale.

EXAMPLE 2

The process was repeated according to Example 1 but at a temperature of 135° C. with the addition of 60 grams of hexane. The recation heat was dissipated by vaporization under reflux conditions of said hexane. A few minutes subsequent to initial monomer addition a cloudiness of the reaction mixture occurred indicating copolymer formation, and during the further addition of the monomers to the reaction mixture solid particles of irregular size were formed. After about 60 minutes of monomer addition when the weight ratio of added monomers to high boiling aromatics charged was about 1:1, undesirable lumping occurred.

EXAMPLE 3

The process was repeated according to Example 2 but the addition of monomers was stopped when the weight ratio of monomers to charged high boiling aromatic solvent medium was 1:2 (after 30 minutes). Within one hour subsequent to the initial charge 448 grams of 2-butoxyethanol were added to the reaction mixture. Subsequently, this mixture was heated to a temperature of 170° C. and during this transition phase a somewhat smeary product was formed which was on the border of processability. The $k$-value of this product was 18. Samples were taken:

After 3 hours' time—Sample a
After 8 hours' time—Sample b.

A portion of Sample "a" was heated an additional 5 hours for post-esterification at a temperature of about 200° C. and was designated as Sample "c." All three samples gelated when subsequently ethoxylated. At the severe final heating of Sample "c" for post-esterification, the colour was visibly deepened. The application of more severe conditions is not possible since not only non-gelated but also light hydroxyl resins are to be produced. Further, although the maleic acid anhydride-styrene copolymer has a $k$-value of less than 20, it cannot be sufficiently esterified.

Following Examples 4–9 illustrate the process of the invention. Examples 4, 5a, 5b, 5c, and 5d as well as 6 and 7 disclose the process for producing lacquer resin solutions and Examples 8 and 9 disclose the recovery of the powdered resins.

EXAMPLE 4

Stage 1

A vessel equipped with a stirrer and having an operating pressure of at least 5 ata. was charged with 213 kg. of an aromatic hydrocarbon solvent medium having a boiling range of from 150 to 170° C. and 2.02 kg. of solid dispersing agent consisting of a 1:1 mole ratio isobutylene to maleic acid half-ester copolymer, said maleic acid having been esterified with an alkanol mixture of from 12 to 18 carbon atoms, said copolymer dispersant having a k-value of 36. The esterifying alcohols employed in the preparation of the dispersant are sold under the trade name "Alfols" and are synthetic primary alkanols derived from the Ziegler process and recovered from aluminum alkoxides by means of hydrolysis. The resultant mixture was heated to a temperature of 150° C. and the following substances were charged thereto within a one hour period:

|  | Kg. |
|---|---|
| Styrene | 104 |
| Maleic acid anhydride | 98 |
| Benzoyl peroxide | 2.02 |

Under the foregoing reaction conditions, a low viscous and coagulum free copolymer suspension was formed at almost quantitative reaction, said suspension being maintained for an additional 2 hours at a temperature of 150° C. after stopping the adding of monomers. The k-value of the resultant maleic acid anhydride-styrene copolymer was 18.

Stage 2

A mixture of

|  | Kg. |
|---|---|
| 2-butoxyethanol | 224 |
| Phosphoric acid | 0.8 | was added within one hour to the resultant suspension of Stage 1 still having reaction temperature. During this partial esterification reaction, the suspended polymer solid is gradually transformed into an almost clear resin solution without the formation of a polymer smear. At a three hours' time of esterification, from 2 to 3 kg. of the reaction by-product water are discharged.

Stage 3

The esterified reaction product obtained from Stage 2 was cooled down to a temperature of 75° C. and mixed with 26.6 kg. of a 50 percent aqueous dimethyl formamide solution. Ethylene oxide in an amount of 88 kg. was added to this mixture within 30 minutes and the reaction temperature was maintained in the range of from 75 to 85° C. The ethoxylation time was 5.5 hours. Subsequently, the excess ethylene oxide was removed at reaction temperature by venting, finally using vacuum (0.1 ata.). The so obtained reactive hydroxyl resin, about 460 kg., was subsequently tested according to standard methods used in resin chemistry with the following results:

| Solid content | About 50 wt. percent. |
|---|---|
| Viscosity | 900 cp. at 50° C. |
| Acid number | 5. |
| Iodine colour number | 3 to 4. |

Said mixture was admixed with melamine (Maprenal RT) in a weight ratio of 85:15 to formulate the baking varnishes. The results are indicated in subsequent Table 1.

The foregoing demonstrates that the addition of the dispersing agent gives the anhydride polymer such a structure that at a k-value of 18, a half-esterification of all anhydride groups is possible thus causing no difficulties in the subsequent ethoxylation.

EXAMPLE 5

The process of Example 4 was repeated but the ethoxylation was stopped after 4 hours' time. The final resin product comprises the following properties:

| Solid content | About 49 wt. percent. |
|---|---|
| Viscosity | 950 cp. at 50° C. |
| Acid number | 20.7. |
| Iodine colour number | 2 to 3. |

The lacquer film properties of this final resin were tested in admixture with melamine resin (Maprenal RT) on two levels and without the melamine resin under varying baking conditions as follows:

5a. Without melamine resin additive at 180° C. during 30 minutes.

5b. With 10 wt. percent melamine additive at 180° C. during 30 minutes.

5c. With 10 wt. percent melamine additive at 130° C. during 30 minutes.

5d. With 30 wt. percent melamine additive at 130° C. during 30 minutes.

The results are shown in subsequent Table 1.

When the baking with 10 wt. percent melamine was conducted at 130° C., the chemical stability of the lacquer film was only moderate. If the melamine content was raised to 30 wt. percent, the elasticity was reduced below the desired level. Surprisingly, it has been found that lacquer films of good chemical stability, with a hardness and elasticity exceeding the minimum values required for practical use, were obtained by promoting alkoxylation so far that the acid number was reduced below 1 and then adjusting the acid number of the mixture to a value of at least 12 by adding phosphoric acid (see Example 7 in Table 1).

EXAMPLE 6

The process was repeated according to Example 4 but 2-butoxyethanol was replaced in the esterification stage by the following ingredients:

|  | Kg. |
|---|---|
| n-Butanol | 74 |
| Phosphoric acid | 0.8 |

After finishing the esterification reaction, the mixture is diluted with further 93 kg. of n-butanol under simultaneous cooling.

In the third stage, the reaction mixture was ethoxylated until an acid number of 4 was obtained. The resultant solution had the following properties:

| Solid content | About 50 wt. percent. |
|---|---|
| Viscosity | From about 2000 to 3000 cp. at 25° C. |
| Acid number | 8, based on solid resin. |
| Iodine colour number | 2 to 3. |

To formulate baking varnishes, the final resin product was admixed with melamine (Maprenal/TTX) in different ratios as mentioned in following Table 2.

Tables 1 and 2 directly following Example 7 set forth the properties of the lacquers resulting from the hydroxyl resins formed by the process of the invention as exemplified by Examples 4, 5, 6 and 7, curing with melamine.

EXAMPLE 7

Example 4 was repeated but the ethoxylation was continued until the residual acid number of the solution decreased to about 1. This happened during 1.5 hours of additional ethoxylation.

The acid number of the resin solution was then readjusted to an acid number of 9 by adding a solution of phosphoric acid in an alcohol or another organic solvent prior to blending the melamine and pigment. The properties of the resin solution were:

| Solid content | About 50 wt. percent. |
|---|---|
| Viscosity | 800 cp. at 50° C. |
| Acid number | 18, based on solid resin. |
| Iodine colour number | 3. |

The lacquer data are shown in Table 1.

TABLE 1

Properties of—White lacquers of a pigment ratio of $TiO_2$: resin=0.75:1

| Example | Test | Hydroxyl resin: melamine, wt. ratio | Acid number | Varnishing conditions | | Erichsen-Deepening (elasticity) | Cross-cut adhesion (Gitter-schnitt) | Stability in— | | Hardness (Koenig) | Gloss (Lange) |
|---|---|---|---|---|---|---|---|---|---|---|---|
| | | | | Min. | °C. | | | Premium gasoline | Alcohol aromatic mixture | | |
| 4 | | 85:15 | 5 | 30 | 180 | 5.8 | 1 + | + | φ | 126 | 88 |
| 5 | a | 100:0 | 20 | 30 | 180 | 7.0 | 1 + | + | O | 134 | 97 |
| | b | 90:10 | 20 | 30 | 180 | 4.7 | 1 + | + | + | 148 | 92 |
| | c | 90:10 | 20 | 30 | 130 | 6.5 | 1-2 φ | | O | 124 | 98 |
| | d | 70:30 | 20 | 30 | 130 | 0.6 | 4 + | + | + | 152 | 96 |
| 7 | | 70:30 | 2.1 (*18) | 30 | 130 | 5.6 | 1-2 + | + | (+)** | 149 | 104 |

NOTE.—+=Complete; φ=Slightly swollen; O=Swollen, but not dissolved; —=Dissolved; *=Acid number, based on solid resin, after adding phosphoric acid to resin solution; ** =Almost complete.

TABLE 2.—PROPERTIES OF CLEAR LACQUERS OF EXAMPLE 6 RESINS

| Mixture, wt. ratio, resin/melamine | Baking conditions | | Erichsen-Deepening (elasticity) | Film properties | | | |
|---|---|---|---|---|---|---|---|
| | | | | Cross-cut adhesion (Gitter-schnitt) | Hardness (Koenig) | Stability in— | |
| | Min. | °C. | | | | Gasoline | Alcohol aromatic mixture |
| 80:20 | 30 | 130 | 6.7 | 1-2 | 185 + | + | φ |
| 75:25 | 30 | 130 | 6.7 | 2 | 185 + | + | (+) |
| 90:10 | 30 | 180 | 6.5 | 1 | 186 + | + | (+) |
| 85:15 | 30 | 180 | 4.6 | 1-2 | 188 + | + | + |

NOTE.—+=Stable; (+)=Nearly unaffected; φ=slightly swollen.

The now following examples were conducted with essentially non-aromatic high boiling hydrocarbons as reaction solvent medium.

EXAMPLE 8

Kerosene in an amount of 420 grams consisting of 15 volume percent of aromatics and 2 volume percent of olefins and 2 grams of a 1:1 mole ratio isobutene-maleic acid n-$C_{12}$-$C_{18}$ half-ester copolymer dispersant described in Example 4, Stage 1, were heated to a temperature of 165° C. During a one hour period 104 grams of styrene, 98 grams of maleic acid anhydride, and 4 grams of benzoyl peroxide (as 40 wt. percent suspension) were continuously added to said solution, the rise in temperature being about 5° C. at the beginning. After one more hour of post-reaction at reaction temperature, the temperature was increased to 175° C. and a mixture of 118 grams of 2-butoxyethanol (butyl glycol) and 0.8 grams of 89 wt. percent phosphoric acid were continuously added to the reaction mixture within one hour. The resultant reaction mixture mainly consisting of the styrene-maleic acid anhydride monobutoxyethyl ester copolymer in dispersed form was reacted for two more hours at a temperature of 175° C. to complete the half-esterification. Subsequently, 18.5 grams of n-butanol were added to said mixture for post-esterification while cooling down to a temperature of 120° C. and said mixture was maintained at said temperature for one hour. After cooling down to a temperature of 90° C., a mixture of 10 grams of dimethyl formamide and 10 grams of water were added and further, within one hour, 116 grams of propylene oxide were added thereto. The resultant mixture was additionally heated for eight hours at a temperature of 95° C. At this time, the reaction mixture consisted of finely divided micro pearls and liquid phase. The solid phase was separated from the liquid phase by means of filtration and subsequently washed with petroleum ether. After drying, a solid resin having an acid number of 4.5, and a melting range of from 100 to 115° C. was obtained.

EXAMPLE 9

Kerosene (composition according to Example 8) in an amount of 840 grams and 8 grams of styrene-maleic acid n-$C_{12}$-$C_{18}$ half-ester copolymer dispersant described in Example 4, Stage 1, added thereto, were heated to a temperature of 165° C. During a one hour period, 208 grams of styrene, 196 grams of maleic acid anhydride, and 8 grams of benzoyl peroxide (as 40 wt. percent suspension) were constantly added to said solution, the rise in temperature was about 5° C. initially. After one more hour of post-reaction at a temperature of 170° C. the temperature was increased to 175° C. and, within one hour, a mixture consisting of 236 grams of butylglycol and 1.6 grams of an 89 wt. percent phosphoric acid was constantly added thereto. This reaction mixture comprising the copolymer still in dispersed form, was reacted for two more hours at a temperature of 175° C., subsequently 37 grams of n-butanol were added for post-esterification under cooling said mixture down to a temperature of 120° C. and maintaining said mixture at said temperature for one hour. Thereafter, it was cooled down to a temperature of 80° C., a mixture of 20 grams of dimethyl formamide and 20 grams of water were added thereto, and within one hour, 176 grams of ethylene oxide were added thereto, the whole being post-reacted for 6 hours at a temperature of 75° C. The solid was separated as in Example 1. The solid resin had an acid number of 3 and a melting range of from 110 to 125° C.

The solid resin produced by the method of the invention may be used for electrostatic powder coating, after pigmentation in a melting step and addition of suitable hardeners. The baking conditions are, for example, 180° C. for 30 min.

We claim:

1. A process for producing a lacquer resin component for baking varnishes by copolymerizing vinyl aromatic hydrocarbon of from 8 to 12 carbon atoms with maleic anhydride in a liquid hydrocarbon solvent medium at a temperature between about 120 and 175° C. utilizing a mole ratio of vinyl aromatic hydrocarbon to maleic acid anhydride of about 1:1 to form a copolymer having a k-value between about 16 and 22, subsequently half-esterifying the copolymer with alkanol or alkoxyalkanol having from 3 to 12 carbon atoms at a temperature between about 140 and 180° C. utilizing a mole ratio of said alkanol or alkoxyalkanol to said initial maleic anhydride of about 1.1:1 and then alkoxylating the resultant about half-esterified copolymer with an alkylene oxide of from 2 to 4 carbon atoms at a temperature between about 60 and 100° C. utilizing a mole ratio of alkylene oxide to initial maleic acid anhydride of between about 1:1 and 1:2, said process being characterized by conducting said copolymerization, said esterification and said alkoxylation in the presence of between about 0.5 and 3.0 wt. percent of a dispersing agent based on the combined weight of said vinyl aromatic hydrocarbon and maleic acid anhydride, said dispersing agent having a k-value of between about 30 and 50 and consisting of a copolymer of (a) an alkene of from 2 to 6 carbon atoms or a vinyl aromatic hydrocarbon of from 8 to 12 carbon atoms, and (b) one or more esters of alkanols having from 10 to 20 carbon atoms and alpha, beta-unsaturated alkenoic acid of from 3 to 4 carbon atoms and/or alpha, beta-unsaturated alkendioic acid of from 4 to 5 carbon atoms, said dispersant prepared utilizing a mole ratio of alkene to said one or more esters of between about 1:1 and 1:1.5.

2. A process in accordance with Claim 1 wherein in said esterification prosphoric acid or phosphoric acid esters are employed as esterification catalyst.

3. A process in accordance with Claim 1 wherein said dispersing agent is a copolymer consisting of a half ester of maleic acid and isobutylene or styrene.

4. A process according to Claim 1 wherein the ester component in said dispersant is derived from a mixture of $C_{12}$ to $C_{18}$ alkanols.

5. A process according to Claim 1 wherein said copolymerizing, said partial esterification and said alkoxylation is conducted in an essentially non-aromatic hydrocarbon solvent medium.

6. A process according to Claim 5 wherein said non-aromatic hydrocarbon solvent medium contains up to 20 volume percent of aromatics.

7. A process in accordance with Claim 5 wherein said non-aromatic hydrocarbon solvent medium is a kerosene fraction boiling at a temperature between 170 and 230° C.

8. A process according to Claim 5 wherein said non-aromatic hydrocarbon solvent medium contains up to 3 volume percent of olefins.

9. A process according to Claim 1 wherein said alkoxylation is conducted until an acid number below 1 is obtained and then subsequently adjusting the acid number of the alkoxylation reaction mixture to a volume of at least 12 by adding phosphoric acid thereto.

References Cited

UNITED STATES PATENTS

| 2,676,934 | 4/1954 | Butler | 260—78.5 T |
| 3,342,787 | 9/1967 | Muskat | 260—78.5 T |
| 3,374,209 | 3/1968 | Hay et al. | 260—78.5 T |
| 3,514,419 | 5/1970 | Darlow et al. | 260—78.5 T |
| 3,306,954 | 2/1967 | Moore | 260—875 |

MURRAY TILLMAN, Primary Examiner

J. ZIEGLER, Assistant Examiner

U.S. Cl. X.R.

260—78.4 E; 78.5 T; 878 R; 886